United States Patent
Sei et al.

(10) Patent No.: US 10,693,927 B2
(45) Date of Patent: *Jun. 23, 2020

(54) PARALLEL EXECUTION OF REQUEST TRACKING AND RESOURCE DELIVERY

(71) Applicant: Google LLC, Mountain View, CA (US)

(72) Inventors: Leo Sei, Mountain View, CA (US); Saurabh Mahajan, Mountain View, CA (US); Ruslan Kudubayev, Mountain View, CA (US); Tao Huang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,947

(22) Filed: Apr. 29, 2019

(65) Prior Publication Data

US 2019/0253468 A1 Aug. 15, 2019

Related U.S. Application Data

(63) Continuation of application No. 15/153,010, filed on May 12, 2016, now Pat. No. 10,277,650.

(51) Int. Cl.
  *G06F 16/955* (2019.01)
  *H04L 29/06* (2006.01)
  (Continued)

(52) U.S. Cl.
  CPC ........ *H04L 65/4084* (2013.01); *G06F 16/955* (2019.01); *G06Q 30/0277* (2013.01);
  (Continued)

(58) Field of Classification Search
  CPC . G06F 7/06; G06F 15/16; G06F 17/30; G06F 17/30964; G06Q 30/02;
  (Continued)

(56) References Cited

U.S. PATENT DOCUMENTS 7,752,073 B2  7/2010  Barry et al.
8,180,376 B1 *  5/2012  Merritt .................. H04W 24/10
                                                    455/456.2

(Continued)

OTHER PUBLICATIONS

Anonymous, "Google Analytics", Dec. 22, 2012 Dec. 22, 2012, pp. 1-4, XP055075215, Retrieved from the Internet URLhttp//en.wikipedia.org/w/index.php?title=Google_Analytics&oldid=529361837, retrieved on Aug. 14, 2013 (7 pages).

(Continued)

*Primary Examiner* — Aftab N. Khan
(74) *Attorney, Agent, or Firm* — Foley & Lardner LLP

(57) ABSTRACT

Systems and methods of parallel uniform resource identifier resource extraction are provided. A tracking uniform resource identifier (URI) generation component can generate a first uniform resource locator (URL) that, responsive to actuation by a client computing device, causes the client computing device to send a content item identifier of a content item and a device identifier of the client computing device, via a computer network, to a records server at a first network location identified by the first URL. A resource URI generation component can generate a second URL that, responsive to actuation by the client computing device, causes the client computing device to retrieve, via the computer network, a first resource from a second network location identified by the second URL for display by the client computing device. A content item packaging component can generate the content item.

20 Claims, 6 Drawing Sheets

(51) Int. Cl.
*H04L 29/08* (2006.01)
*G06Q 30/02* (2012.01)
*H04L 29/12* (2006.01)

(52) U.S. Cl.
CPC .......... *H04L 61/1582* (2013.01); *H04L 67/02* (2013.01); *H04L 67/146* (2013.01); *H04L 67/20* (2013.01); *H04L 67/32* (2013.01)

(58) Field of Classification Search
CPC ........... G06Q 30/0217; G06Q 30/0242; G06Q 30/0248; H04L 29/12066; H04L 61/1511; H04L 67/02; H04L 67/22; H04W 24/00; H04W 24/10
See application file for complete search history.

(56) References Cited

U.S. PATENT DOCUMENTS

| | | | |
|---|---|---|---|
| 8,321,269 B2 | 11/2012 | Linden et al. | |
| 8,874,563 B1 | 10/2014 | Brown et al. | |
| 9,092,800 B2 | 7/2015 | Owen et al. | |
| 2003/0167213 A1 | 9/2003 | Jammes et al. | |
| 2003/0187923 A1* | 10/2003 | Kimura | H04L 29/06 709/203 |
| 2005/0038900 A1 | 2/2005 | Krassner et al. | |
| 2005/0278443 A1 | 12/2005 | Winner et al. | |
| 2006/0221940 A1* | 10/2006 | Ong | H04L 12/2856 370/352 |
| 2007/0288454 A1 | 12/2007 | Bolivar et al. | |
| 2008/0040143 A1 | 2/2008 | Freeman | |
| 2008/0294711 A1* | 11/2008 | Barber | G06Q 30/02 709/201 |
| 2009/0094175 A1* | 4/2009 | Provos | G06F 21/564 706/12 |
| 2009/0216592 A1 | 8/2009 | Zhang | |
| 2010/0324989 A1 | 12/2010 | Etchegoyen | |
| 2011/0153411 A1 | 6/2011 | Levav et al. | |
| 2011/0185016 A1* | 7/2011 | Kandasamy | G06Q 10/06 709/203 |
| 2011/0213655 A1* | 9/2011 | Henkin | G06Q 30/00 705/14.49 |
| 2011/0238495 A1* | 9/2011 | Kang | G06Q 30/02 705/14.49 |
| 2011/0258049 A1 | 10/2011 | Ramer et al. | |
| 2011/0270674 A1 | 11/2011 | Cosman | |
| 2012/0130829 A1* | 5/2012 | Roth | G06Q 30/02 705/14.71 |
| 2012/0173345 A1* | 7/2012 | Yanefski | G06Q 30/02 705/14.73 |
| 2012/0311017 A1 | 12/2012 | Sze et al. | |
| 2012/0324326 A1 | 12/2012 | Kim | |
| 2013/0018721 A1 | 1/2013 | Levine et al. | |
| 2013/0110585 A1* | 5/2013 | Nesbitt | G06Q 30/02 705/7.35 |
| 2013/0204696 A1 | 8/2013 | Krassner et al. | |
| 2013/0275547 A1 | 10/2013 | Chew et al. | |
| 2013/0346186 A1 | 12/2013 | Bezos et al. | |
| 2015/0186913 A1 | 7/2015 | Mann et al. | |
| 2015/0206177 A1 | 7/2015 | Yao et al. | |
| 2017/0111375 A1* | 4/2017 | Provos | G06F 21/564 |

OTHER PUBLICATIONS

Arvind Jain et al., "Beacon", Jun. 24, 2014 Jun. 24, 2014 XP055338331 Retrieved from the Internet URL https //www.w3 org/TR/2014/WD-beacon-20140624, retrieved on Jan. 24, 2017 (12 pages).
Final Office Action on U.S. Appl. No. 14/975,027 dated Jul. 25, 2019 (10 pages).
Henson, John. "How to Track Ad Results Using Google Analytics." Web Marketing Today, Jan. 8, 2008 (4 pages).
Ian Oxley, "Introduction to the Beacon API", Jan. 2015 Jan. 9, 2015, XP055337484,Retrieved from the Internet URL:https://www.sitepoint .com/introduction-beacon-api/ retrieved on Jan. 20, 2017 (6 pages).
Ilya Grigorik, Beacon W3C Working Draft Feb. 25, 2016, Web Performance Working Group, Copyright 2016, W3C (10 pages).
International Preliminary Report on Patentability for Appln. Ser. No. PCT/US2016/062111 dated Mar. 20, 2018 (29 pages).
International Search Report and Written Opinion for Appln.Ser. No. PCT/US2016/062111 dated Feb. 2, 2017 (13 pages).
Naviator.sendBeacon, Article, Apr. 19, 2016, Copyright 2005-2016 Mozilla Developer Network and Individual Contributors (9 pages).
Non-Final Office Action on U.S. Appl. No. 14/975,027 dated Feb. 1, 2019 (8 pages).
Non-Final Office Action on U.S. Appl. No. 14/975,027 dated Jun. 29, 2018 (8 pages).
Non-Final Office Action on U.S. Appl. No. 15/153,010 dated Jun. 25, 2018 (17 pages).
Notice of Allowance on U.S. Appl. No. 15/153,010 dated Mar. 29, 2019 (2 pages).
Notice of Allowance on U.S. Appl. No. 15/153,010 dated Nov. 28, 2018 (7 pages).
Stearns, Michael. "Tagging URLs for better Tracking in Google Analytics." Practical Ecommerce. Jul. 16, 2009 (5 pages).
URL Builder—Google Analytics Help. Oct. 18, 2013 (3 pages).
U.S. Office Action on U.S. Appl. No. 14/057,421 dated Feb. 12, 2014 (28 pages).
U.S. Office Action on U.S. Appl. No. 14/057,421 dated Jul. 31, 2014 (38 pages).
U.S. Office Action on U.S. Appl. No. 14/057,421 dated Mar. 20, 2015 (15 pages).
Using ValueTrack—Google AdWords Help. Oct. 18, 2013 (7 pages).
"Google Analytics", Wikipedia, Dec. 22, 2017, retrieved Feb. 18, 2020 from URL: https://en.wikipedia.org/w/index.php?title=Google_Analytics&oldid=529361837 (8 pages).
Examination Report for EP Appln. Ser. No. 16805635.6 dated Jan. 22, 2020 (8 pages).
Final Office Action on U.S. Appl. No. 14/975,027 dated Nov. 29, 2019 (10 pages).
Jain et al., "Beacon: W3C Last Call Working Draft Jun. 24, 2014", 2014, retrieved Feb. 18, 2020 from URL: https://www.w3.org/TR/2014/WD-beacon-20140624/ (5 pages).
Oxley, Ian, "Introduction to Beacon API", Sitepoint, Jan. 9, 2015, retrieved Feb. 18, 2020 from URL: https://www.sitepoint.com/introduction-beacon-api/ (4 pages).
Non-Final Office Action for U.S. Appl. No. 14/975,027 dated Mar. 6, 2020 (10 pages).

* cited by examiner

PARALLEL EXECUTION OF REQUEST TRACKING AND RESOURCE DELIVERY

CROSS-REFERENCES TO RELATED APPLICATIONS

This application claims the benefit of priority under 35 U.S.C. § 120 as a continuation of U.S. patent application Ser. No. 15/153,010 filed May 22, 2016, and titled "PARALLEL EXECUTION OF REQUEST TRACKING AND RESOURCE DELIVERY," which is incorporated by reference herein in its entirety.

BACKGROUND

Responsive to an actuation, a browser installed on a client computing device can extract a uniform resource locator (URL) from the content item, and retrieve an online resource from a network location specified by the URL. In addition to the network location of the online resource, the URL can also specify one or more redirects. A redirect in the URL can direct the browser to transmit data to a different network location prior to retrieval of the online resource. Each additional redirect adds a delay between actuation of the content item and display of the online resource. The redirects can be used to perform accounting or measurement of the content item actuation, but may not otherwise provide much additional value to the user. If the delay becomes significant, the user may become frustrated and cancel retrieval of the online resource prior to completion.

SUMMARY

At least one aspect is directed to a system of parallel uniform resource identifier resource extraction. The system can include a tracking uniform resource identifier (URI) generation component of a data processing system that generates a first uniform resource locator (URL) that, responsive to actuation by a client computing device, causes the client computing device to send a content item identifier of a content item and a device identifier of the client computing device, via a computer network, to a records server at a first network location identified by the first URL. The system can include a resource URI generation component of the data processing system that generates a second URL that, responsive to actuation by the client computing device, causes the client computing device to retrieve, via the computer network, a first resource from a second network location identified by the second URL for display by the client computing device. The system can include a content item packaging component that generates the content item, the content item comprising a renderable portion, the content item identifier, the first URL, and the second URL. The system can include a remote device identification component that sets, via the computer network, a data block on the client computing device to include the device identifier. The system can include a content item placement component to provide, to the client computing device via the computing network, the content item for display on the client computing device, the client computing device operational to extract the first URL and the second URL from the content item during an overlapping time period responsive to actuation of the content item.

At least one aspect is directed to a method of parallel uniform resource identifier resource extraction. The method can include generating, by a tracking uniform resource identifier (URI) generation component of a data processing system, a first uniform resource locator (URL) that, responsive to actuation by a client computing device, causes the client computing device to send a content item identifier of a content item and a device identifier of the client computing device, via a computer network, to a records server at a first network location identified by the first URL. The method can include generating, by a resource URI generation component of the data processing system, a second URL that, responsive to actuation by the client computing device, causes the client computing device to retrieve, via the computer network, a first resource from a second network location identified by the second URL for display by the client computing device. The method can include generating, by a content item packaging component, the content item, the content item comprising a renderable portion, the content item identifier, the first URL, and the second URL. The method can include setting, by a remote device identification component via the computer network, a data block on the client computing device to include the device identifier. The method can include providing, by a content item placement component to the client computing device via the computing network, the content item for display on the client computing device, the client computing device operational to extract the first URL and the second URL from the content item during an overlapping time period responsive to actuation of the content item.

At least one aspect is directed to a non-transitory computer-readable medium storing software instructions comprising instructions executable by one or more computers which, upon execution, cause the one or more computers to perform operations including generating, by a tracking uniform resource identifier (URI) generation component of a data processing system, a first uniform resource locator (URL) that, responsive to actuation by a client computing device, causes the client computing device to send a content item identifier of a content item and a device identifier of the client computing device, via a computer network, to a records server at a first network location identified by the first URL. The operations can include generating, by a resource URI generation component of the data processing system, a second URL that, responsive to actuation by the client computing device, causes the client computing device to retrieve, via the computer network, a first resource from a second network location identified by the second URL for display by the client computing device. The operations can include generating, by a content item packaging component, the content item, the content item comprising a renderable portion, the content item identifier, the first URL, and the second URL. The operations can include setting, by a remote device identification component via the computer network, a data block on the client computing device to include the device identifier. The operations can include providing, by a content item placement component to the client computing device via the computing network, the content item for display on the client computing device, the client computing device operational to extract the first URL and the second URL from the content item during an overlapping time period responsive to actuation of the content item.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
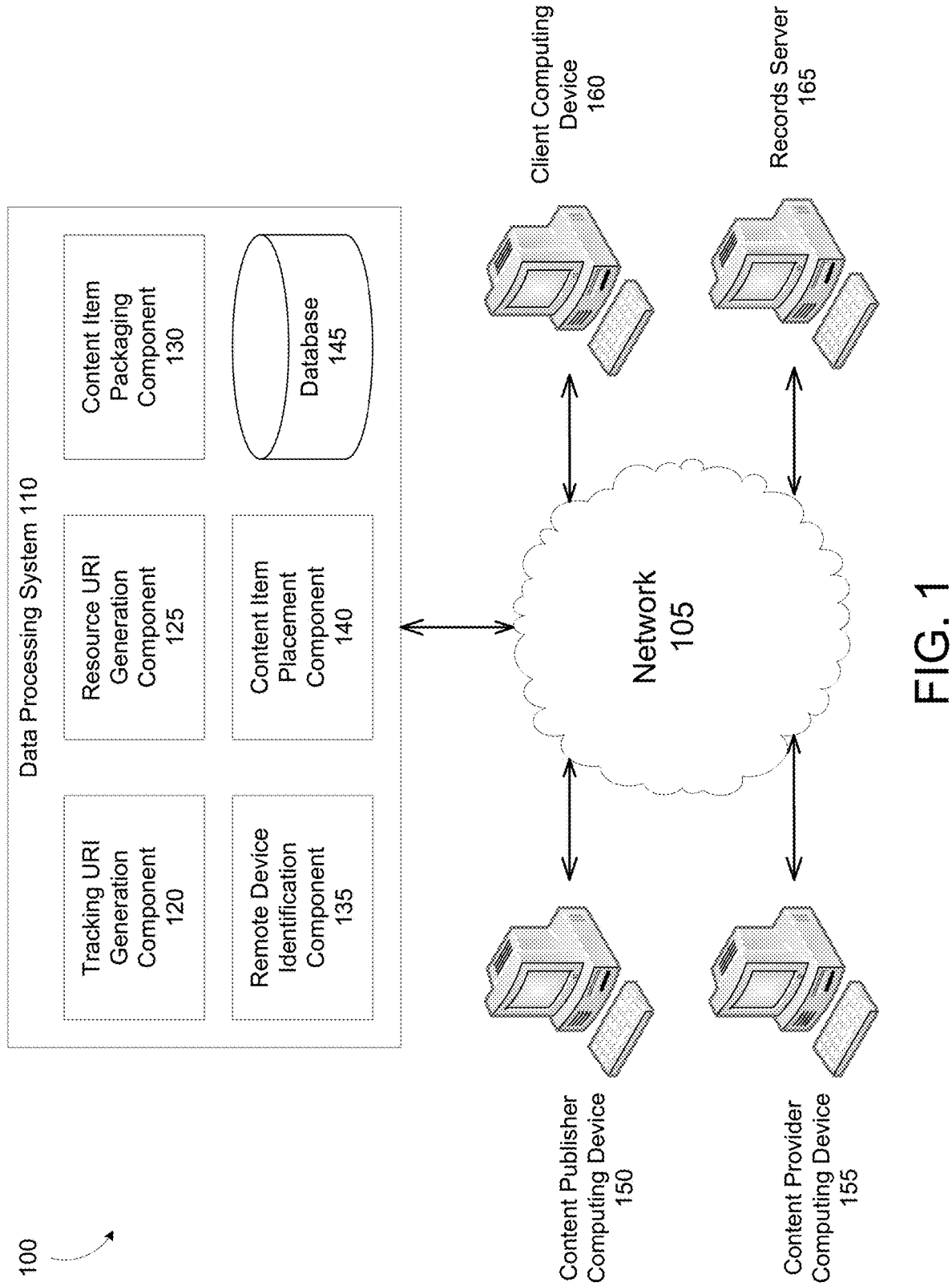
FIG. 1 is a block diagram depicting an example environment for execution of request tracking and resource delivery, according to an illustrative implementation.

Following below are more detailed descriptions of various concepts related to, and implementations of, methods, apparatus, and systems of parallel uniform resource identifier resource extraction. The various concepts introduced above and discussed in greater detail below may be implemented in any of numerous ways, as the described concepts are not limited to any particular manner of implementation.

Systems and methods of the present disclosure describe parallel execution of request tracking and resource delivery. Some content items include a link with one or more redirects that allow for third-party tracking of the click. Such redirects may be executed in series before to the resource request, which can add latency prior to the ultimate delivery of the requested resource. A system that allows for the tracking of a request to occur in parallel with delivery of the requested resource can reduce the latency between the clicking of a content item in an online document and the delivery of the corresponding resource.

For example, a user of a client computing device may observe an online document rendered in a browser executed on the client computing device. The online document may include one or more content items, such as ads, that include links to other online resources, such as landing pages, online documents or apps that relate or correspond to the content items. When the user clicks on one of the content items, the browser can follow a series of redirects before requesting, and ultimately receiving and displaying, the resource associated with the content item. Each redirect can cause latency prior to delivery of the resource. Such latency can be more pronounced on mobile devices with poor network connectivity. The redirects may deliver measurement data back to a server or the content item provider, but may not add value to the displayed resource.

The systems and methods described herein can reduce this latency by providing content items with separate uniform resource identifiers (URIs) for issuing the resource request and tracking the resource request, respectively. The first URI can include a first URL that causes a client computing device to connect to a records server for tracking of the request. The client computing device can connect to the records server using, for example, a send beacon. The second URI can include a second URL that causes the client computing device to load the resource associated with the content item; e.g., a landing page. The separate URIs can be actuated in parallel and during an overlapping time period. In this manner, latency between the clicking of the content item and delivery of the resource can be reduced, for example, without sacrificing the collection of measurement data.

The data processing system can: (1) define a URL structure whereby a content provider can provide two URLs for a content item; (2) set a data block on a client computing device for use in identifying the client computing device; (3) invoke a send beacon to create a connection between the client computing device and the data processing system for reading the data block; and (4) deliver the resource to the client computing device in parallel with the invocation of the send beacon.

The data processing system can track clicks (or other actuations such as rollovers or other input commands) associated with the content item at the client computing device, while allowing faster delivery of the resource corresponding to the content item. The systems and methods can track various types of content item actuations. For example, the systems and methods can identify clicks of content items or online documents that can be provided for display on a computing device, for example, as search results responsive to a search query. Each search result can be provided with a first URI and a second URI such that clicking on the search result causes an invocation of send beacon for tracking purposes in parallel, and during an overlapping time period, with delivery of the document or resource associated with the search result. The systems and methods can also allow a web server to determine the sources of incoming traffic; e.g., from social media, organic search results, or ads. This source information can allow the web server to tailor its content to requests originating from different sources.

FIG. 1 is a block diagram depicting an example environment 100 for determining the effectiveness of content items in a computer network environment, according to an illustrative implementation. The environment 100 includes a data processing system 110 that can interface with a content publisher computing device 150, a content provider computing device 155, a client computing device 160, and a records server 165 via a network 105. The data processing system 110 can include a tracking uniform resource identifier (URI) generation component 120, a resource URI generation component 125, a content item packaging component 130, a remote device identification component 135, a content item placement component 140, and a database 145. Each component of the system may be embodied in hardware, software, or combinations thereof. Each component may be a part of the data processing system 110 that can be local to one computing device, or spread across multiple computing devices; e.g., in a data center or across multiple data centers.

The content publisher computing device 150 can publish primary content including online resources such as web sites and other online documents, for viewing and use by client computing devices 160. The content publisher computing device 150 can provide spaces or slots in the primary content. A content provider computing device 155 can provide content items for display in the slots. The client computing device 160 can request primary content from the content publisher computing device 150, and render the primary content for display using a browser application. To retrieve content for display in the slot of the online resource, the client computing device 160 can send a request to the content publisher computing device 150, the content provider computing device 155, or the data processing system 110. The client computing device 160 can receive, in response to the request, a content item for display in the slot.

The content provider computing device 155 can provide content items for display in the primary content. As described above, the client computing device 160 can load the primary content provided by the content publisher computing device 150, and request content for display in the slot of the primary content. The content provider computing device 155 can provide a content item to the client computing device 160 in response to the request for content. The content provider computing device 155 may not provide the content item directly to the client computing device 160. Rather, the content provider computing device 155 may provide the content item or multiple content items to a content item distribution network. In some implementations, the data processing system 110 can serve as the content item distribution network. The content item distribution network may receive content items from many different content provider computing devices 155. The content item distribution network may provide content items to many different client computing devices 160. The content item distribution network may perform a selection process to determine which content item to provide in response to each request. The selection process may take into account various characteristics of the request, the content item, and the online resource in which the content item will be displayed. The selection process may take into account compensation offered by the content provider computing device 155, or an agent associated with the content provider computing device 155, for display of the content item. The offer may be contingent upon the content item distribution network providing the content item to a client computing device 160. The offer may be contingent upon an action subsequent to delivery of the content item. For example, the offer may be contingent upon actuation, by the client computing device 160, of the content item (e.g., display, cursor hover over, or click). The offer may be contingent upon the client computing device 160 selectively loading an online resource (e.g., as a landing page) associated with the content item. The offer may be contingent upon the client computing device 160 performing an interaction with the online resource, such as a purchase or other conversion. The content item distribution network may be embodied in the data processing system 110 or as a distinct entity.

The client computing device 160 can perform computing operations including displaying online resources via the network 105. The client computing device 160 can include a personal computer, smartphone, tablet, or the like. The client computing device 160 can display online resources as rendered by a web browser or other application including a dedicated social media or shopping application. Online resources can have one or more slots for the display of content items provided by a third party such as the content provider computing device 155. When the client computing device 160 loads an online resource, it can transmit a request to the data processing system 110, or other content item distribution network, for content to display in the slot. The data processing system 110 can select a content item for display by the client computing device 160, as described above. The client computing device 160 can receive the content item from the data processing system 110. The client computing device 160 can also receive the content item directly from the content provider computing device 155, or another computing device associated with the content provider computing device 155. The client computing device 160 can render the content item with the online document, and display both on a screen of the client computing device 160. The client computing device 160 can actuate the content item. Actuation of the content item can cause the client computing device 160 to request an online resource associated with the content item. For example, the content item may be an ad, and the online resource may be a landing page, app, or other online document associated with the content item. The online resource may be provided by the content provider computing device 155, or another computing device or system associated with the content provider computing device 155. For simplicity's sake herein, the content provider computing device 155 is described as the provider of both the content item and the associated online resource.

The client computing device 160 can include a memory. The client computing device 160 can store in the memory data blocks corresponding to different online resources and content items loaded by the client computing device 160. When the browser application renders an online resource or a content item, the client computing device 160 can transmit or receive data from these data blocks. Each data block can correspond to a particular content item, a particular online resource, a particular content publisher computing device 150, a particular content provider computing device 155, the data processing system 110, or other entity. Each particular entity can set or read data from its corresponding data block on the client computing device 160. The particular entity can use this information to identify the client computing device 160 and retrieve information associated with the client computing device 160, such as stored preferences, previous activity, or to keep a client computing device 160 login open. For example, the client computing device 160 may store a data block corresponding to an online resource published by the content publisher computing device 150. The data block may take the form of a persistent HTTP cookie. When the client computing device 160 requests an online document from the content publisher computing device 150, the client computing device 160 may include data from the data block in the request. The client computing device 160 can receive the request along with the data. The content publisher computing device 150 can use the data to recognize the client computing device 160 as a previous visitor. The content publisher computing device 150 can present a personalized online resource to the client computing device 160. The content publisher computing device 150 may set the data in the data block to a different state during the client computing device's 160 interaction with the online resource. In another example, if the client computing device 160 is requesting an online resource from the content publisher computing device 150 for the first time (or, for some other reason, does not have a data block corresponding to the online resource), the content publisher computing device 150 may set a data block on the client computing device 160 for future use.

The record server 165 can record action of the client computing device 160. The records server 165 can be a third-party service employed by the content provider computing device 155 to maintain an accounting of actuations of content times provided by the content provider computing device 155. When the client computing device 160 actuates a content item rendered with an online resource, the client computing device 160 can extract a URI from the content item. The URI can include a uniform resource locator (URL) of an online resource. The client computing device 160 can retrieve, via the network 105, the online resource from a network location identified by the URL. The URL can contain addition instructions that cause the client computing device 160 to perform on or more redirects prior to retrieving the online resource. For example, the URL can include a redirect instruction to perform a redirect to the records server 165. Upon extracting the URL and executing the redirect instruction, the client computing device 160 can open a connection with the records server 165. The client computing device 160 can use the connection to transmit data to the records server 165. The data can include a data block associated with the records server 165 and an identifier of the content item. The records server 165 can use this data to identify the client computing device 160 and the content item, and determine that the content item was actuated by the client computing device 160. The records server 165 can store this information in a memory as a recorded action. This information can be used by the records server 165 for maintaining an accounting of actuations of content items provided by the content provider computing device 155.

The URL extracted from the content item may contain a second redirect instruction. The second redirect instruction may instruct the client computing device 160 to open a connection with the data processing system 110. The client computing device 160 can use the connection to transmit data to the data processing system 110. The data processing system 110 can use this data to maintain an accounting of content items actuated by the client computing device 160. The data can include a data block associated with the data processing system 110 and an identifier of the content item. The data processing system 110 can use this data to identify the client computing device 160 and the content item, and determine that the content item was actuated by the client computing device 160. The data processing system 110 can store this information in the database 145 as a recorded action. This information can be used by the data processing system 110 for maintaining an accounting of actuations of content items provided by the content provider computing device 155. Although similar, the separate redirect instructions to the records server 165 and the data processing system 110, respectively, may be independently useful. For example, the records server 165 may be an agent of the content provider computing device 155, while the data processing system 110 may be an agent of the content item distribution network. The content item distribution network may use the accounting of the data processing system 110 for the purpose of performing content actuation-based billing and compensation to the content provider computing device 155 and the content publisher computing device 150, respectively. The content item distribution network may additionally use the accounting estimate quality or effectiveness of individual content items, and for tuning its content item selection parameters. The content provider computing device 155 may use the accounting of the records server 165 to correlate content actuations with conversions performed in the second online resource, measure content item quality or effectiveness, and verify the accounting of the data processing system 110.

The data processing system 110 can include a tracking URI generation component 120. The tracking URI generation component 120 can generate a first uniform resource locator (URL). The data processing system 110 can include the first URL in a content item, and deliver the content item to the client computing device 160 via the network 105. The tracking URI generation component 120 can generate the first URL such that when the client computing device 160 extracts the first URL from the content item and actuates it, the client computing device 160 will open a connection to a records server 165 at a network location identified by the first URL. The client computing device 160 can transmit a content item identifier of the content item and a device identifier of the client computing device 160 to the records server 165.

In some implementations, the tracking URI generation component 120 can generate the first URL such that it includes an instruction to invoke a send beacon to create a connection between the client computing device 160 and the records server 165 for transmission of the content item identifier and the device identifier. The client computing device 160 can use the send beacon to schedule asynchronous and non-blocking delivery of the content item identifier and the device identifier to the records server 165. The send beacon request can be prioritized by the client computing device 160 such that it does not compete with time-critical operations and higher priority network request being executed by the client computing device 160. In this manner, the data can be sent to the records server 165 without delaying or interrupting any other network use by the client computing device. The send beacon request can guaranteed to be initiated for the online resource is unloaded, and allowed to run to completion without requiring blocking request or other techniques that block processing of user interactive events.

The data processing system 110 can include a resource URI generation component 125. The resource URI generation component 125 can generate a second URL. The data processing system 110 can include the second URL in the content item delivered to the client computing device 160. The resource URI generation component 125 can generate the second URL such that when the client computing device 160 extracts the second URL from the content item and actuates it, the client computing device 160 will request a first online resource from a second network location identified by the second URL. The client computing device 160 can retrieve the first online resource from the content provider computing device 155. The client computing device 160 can display the first online resource.

The second URL can include an instruction that causes the client computing device 160 to perform a redirect via the data processing system 110 prior to retrieval of the online resource. The redirect can allow the client computing device 160 to transmit data about the second URL actuation to the data processing system 110. The data processing system 110 may use this data for accounting purposes, such as recording content item actuations. The data processing system 110 may also maintain this data for reconciliation purposes, such as correlating content item actuations with actions performed by the client computing device 160 in the requested online resource. In some implementations, the client computing device 160 can actuate the first URL during an overlapping time period with retrieval of the online resource. In that manner, the client computing device 160 can retrieve the online resource without waiting for completion of the transmission of data to the records server 165. This parallel operation can reduce latency in the display of the online resource by the client computing device 160. This can be beneficial, for example, when the content item is an ad and the online resource is a landing page, app, or other online document that corresponds to the content item. A user of the client computing device 160 who clicked on the content item may become frustrated by a significant delay between clicking on the content item and the display of the online resource. A frustrated user may cancel retrieval of the online resource by, for example, using a back button of the browser, closing the tab, closing the window, or exiting the browser. Reducing this delay can thus improve the user experience while increasing the success with which the content provider computing device 155 is able to deliver its resources to the client computing device 160.

The content item identifier can include a unique key. The unique key can comprise an identifier for the particular instance of the content item that allows for later reconciliation of activities involving the particular instance of the content item. For a single content item, this unique key can be shared by the first URL and the second URL such that each URL carries the same key. The unique key can be delivered by the client computing device 160 to the records server 165 via the first URL, and to the content provider computing device 155 via the second URL. The client computing device 160 can deliver the unique key to the data processing system 110 during the redirect prior to retrieving the online resource from the content provider computing device 155. The records server 165 and data processing system 110 can include the unique key in its records of content item actuation. The content provider computing device 155 can include the unique key in its records of any actions performed by the client computing device 160 in the online resource provided by the content provider computing device. This allows for reconciliation of the content item actuation with actions performed in the online resource by one of records server 165, data processing system 110, the content provider computing device 155, or an associated system. The client computing device 160 can generate the unique key. For example, the client computing device 160 can actuate the first URL and the second URL at, or close to, the same time, and transmit the unique key with each request. In some implementations, the data processing system 110 can generate the unique key. For example, the client computing device 160 may first have to actuate a redirect to the data processing system 110 to retrieve the unique key prior to actuating the first URL, and prior to actuating the online resource request specified by the second URL. Once the client computing device 160 has retrieved the unique key from the data processing system 110, the client computing device 160 may then include the unique key in both its transmission to the records server 165, and its request to the content provider computing device 155.

The data processing system 110 can include a content item packaging component 130. The content item packaging component 130 can generate the content item. The content item can include a renderable portion, the content item identifier, the first URL, and the second URL. The renderable portion can include an image or text. The renderable portion can include other graphical formats such as animated images or videos. The renderable portion can include interactive elements such as pop-ups that, when rendered in the browser of the client computing device 160, activate when an input device of the client computing device 160 directs a cursor to the vicinity of an active element of the renderable portion. The renderable portion may include additional interactive elements such as clickable zones or buttons for operations including play, pause, skip, and mute. The content item packaging component 130 can receive the renderable portion from the content provider computing device 155. The content item packaging component 130 can also receive a portion of the content item identifier from the content provider computing device 155. This portion of the content item identifier may be used by the content provider computing device 155 to track deliveries actuations of the content item. In some implementations, the data processing system 110 can generate this portion of the content item identifier. For example, the data processing system 110 can maintain its own accounting of content item actuations, or provide records of the content item identifiers to the content provider computing device 155. In either case, the content item identifier can allow the content provider computing device 155 to measure the effectiveness of various content items, or types of content items. The content item packaging component 130 can receive the first URL from the tracking URI generation component 120. The content item packaging component 130 can receive the second URL from the resource URI generation component 125. The content item packaging component 130 can combine the renderable portion, the content item identifier, the first URL, and the second URL to generate the content item.

The data processing system 110 can include a remote device identification component 135. The remote device identification component 135 can set a data block on the client computing device 160. The remote device identification component 135 can transmit data for the data block to the client computing device 160 via the network 105. The data can include a device identifier of the client computing device 160. The remote device identification component 135 can receive the device identifier from the client computing device 160 during redirects or requests, and use it to identify requests received from the client computing device 160.

The data processing system 110 can include a content item placement component 140. The content item placement component 140 can provide, to the client computing device 160 via the network 105, the content item for display on the client computing device 160. The client computing device 160 can receive the content item and render it in a display. When the client computing device 160 actuates the content item, the client computing device 160 can extract the first URL and the second URL from the content item. The client computing device 160 can extract the first URL and the second URL during an overlapping time period. In some implementations, the content item placement component 140 can receive a request for content for display in a slot in primary content displayed by the client computing device 160. The content item placement component 140 can receive the request from a browser application executed on the client computing device 160. The content item placement component 140 can send the content item to the client computing device 160 in response to the request. When the client computing device 160 actuates the content item, the client computing device 160 can request the online resource from the content provider computing device 155.

The data processing system 110 can include a database 145. The database 145 can be implemented as a database or other data structure residing on a computer-accessible storage medium such as a hard drive, optical drive, solid-state drive, cloud storage, or the like. The database 145 can store instructions that cause the data processing system 110 to execute the operations of the systems and methods described herein. The database 145 can store records of content item actuations that include redirects or requests to the data processing system 110. The database 145 can store device identifiers for use in identifying redirects or requests originating from particular client computing devices 160. The database 145 can store content items for delivery to client computing devices 160. The database 145 can store additional data to support the functions of the data processing system 110 described herein.

Figure 2:
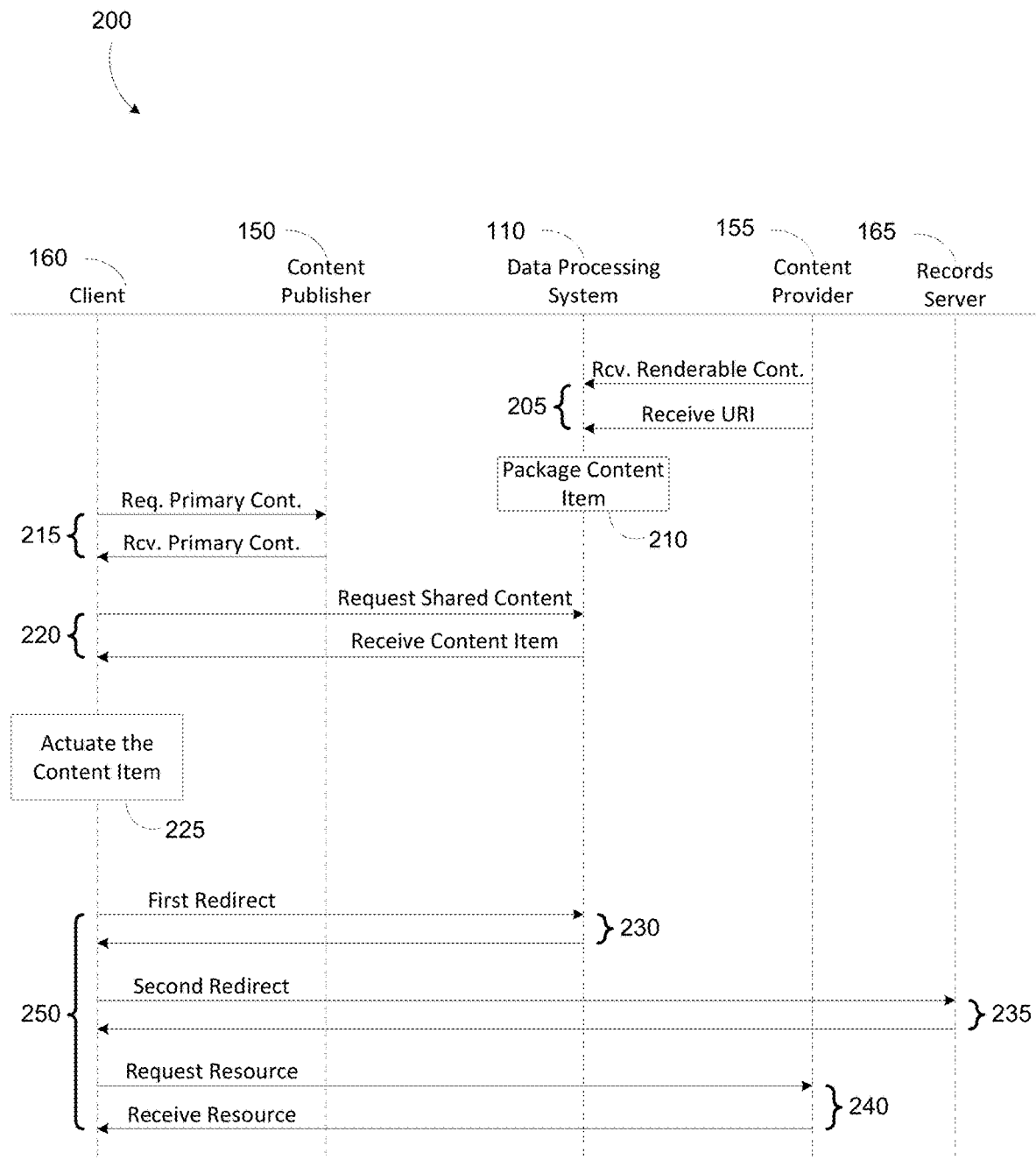
FIG. 2 is a functional diagram illustrating request tracking and resource delivery, according to an illustrative implementation.

FIG. 2 is a functional diagram 200 illustrating request tracking and resource delivery, according to an illustrative implementation. The diagram 200 illustrates the technical actions of packaging and transmitting data between the client computing device 160, the content publisher computing device 150, the data processing system 110, the content provider computing device 155, and the records server 165.

In act 205, the data processing system 110 can receive, from the content provider computing device 155, renderable content and a universal resource identifier (URI) for packaging into a content item. The renderable content can include text, a static image, an animated image, or video. The URI can comprise a network location of the content provider computing device 155 from which the client computing device may retrieve an online resource associated with the content item. The resource URI generation component 125 of the data processing system 110 can use the URI received from the content provider computing device 155 to generate a URL. The URL, when actuated by the client computing device 160, can cause the client computing device 160 to retrieve, via the network 105, the online resource from the content provider computing device 155. The resource URI generation component 125 can include additional data to the URL. For example, the resource URI generation component 125 can include instructions that cause the client computing device 160 to perform one or more redirects prior to retrieving the online resource. These redirects can transmit data regarding the actuation of the content item to the data processing system 110 or the records server 165. In act 210, the content item packaging component 130 of the data processing system 110 can package the renderable content, a content item identifier, and the URL into a content item for presentation to the client computing device 160.

In act 215, the client computing device 160 can request primary content from the content publisher computing device 150. The content publishing computing device 150 can transmit the requested primary content to the client computing device 160. The client computing device 160 can render the primary content and present it for display. The primary content may include an online resource such as an online document or webpage. The primary content may include one or more placeholders or slots for shared content to be displayed. Shared content can be provided by a third-party provider, such as the data processing system 110 or the content provider computing device 155. When the client computing device 160 renders the primary content, it may request shared content from the data processing system 110 for shared content.

In act 220, the client computing device 160 can submit, via the network 105, a request for shared content to the data processing system 110. The data processing system 110 can transmit the content item to the client computing device 160 in response to the request. The client computing device 160 can render the content item in the slot provided in the rendered primary content, and display both.

In act 225, the client computing device 160 can actuate the content item. The actuation may be in response to a click or other selection of the rendered content item. When the content computing device 160 actuates the content item, it can extract the URL that the content item packaging component 130 packaged into the content item. The URL can include instructions to perform one or more redirects and retrieve an online resource.

In act 230, the client computing device 160 can perform a first redirect as specified by the URL. The first redirect can cause the client computing device 160 to open a connection, via the network 105, to the data processing system 110. The client computing device 160 can transmit data to the data processing system 110 via the connection. The data can include a content item identifier of the content item and a device identifier of the client computing device 160. The data processing system 110 can use the received data for accounting or measurement purposes. The data processing system 110 may perform the accounting or measurement according to its role as a content item distribution network. Following completion of the first redirect, the client computing device 160 can perform a second redirect.

In act 235, the client computing device 160 can perform the second redirect as specified by the URL. The second redirect can cause the client computing device 160 to open a connection, via the network 105, to the records server 165. The client computing device 160 can transmit data to the records server 165 via the connection. The data can include the content item identifier and the device identifier. The records server 165 can use the received data for accounting or measurement purposes. The records server 165 may perform the accounting or measurement according to its role as a measurement service for the content provider computing device 155. Following completion of the second redirect, the client computing device 160 can request the online resource associated with the content item.

In act 240, the client computing device 160 can request the online resource associated with the content item. The client computing device 160 can transmit the request, via the network 105, to the content provider computing device 155. The content provider computing device 155 can transmit the online resource to the client computing device 160 in response to the request. The client computing device 160 can then render and display the online resource.

The time between the actuation of the content item and receipt of the online resource can be referred to as the latency 250. Because each redirect may need to be performed serially prior to retrieval of the online resource, the latency 250 can be significant, particularly when the client computing device 160 is a mobile device working over a wireless network. Excessive latency 250 can harm the user experience and, in egregious cases, cause a user of the client computing device 160 to cancel retrieval of the online resource prior to completion. This may harm the content provider computing device's 155 ability to provide the online resource to the client computing device 160.

Figure 3:
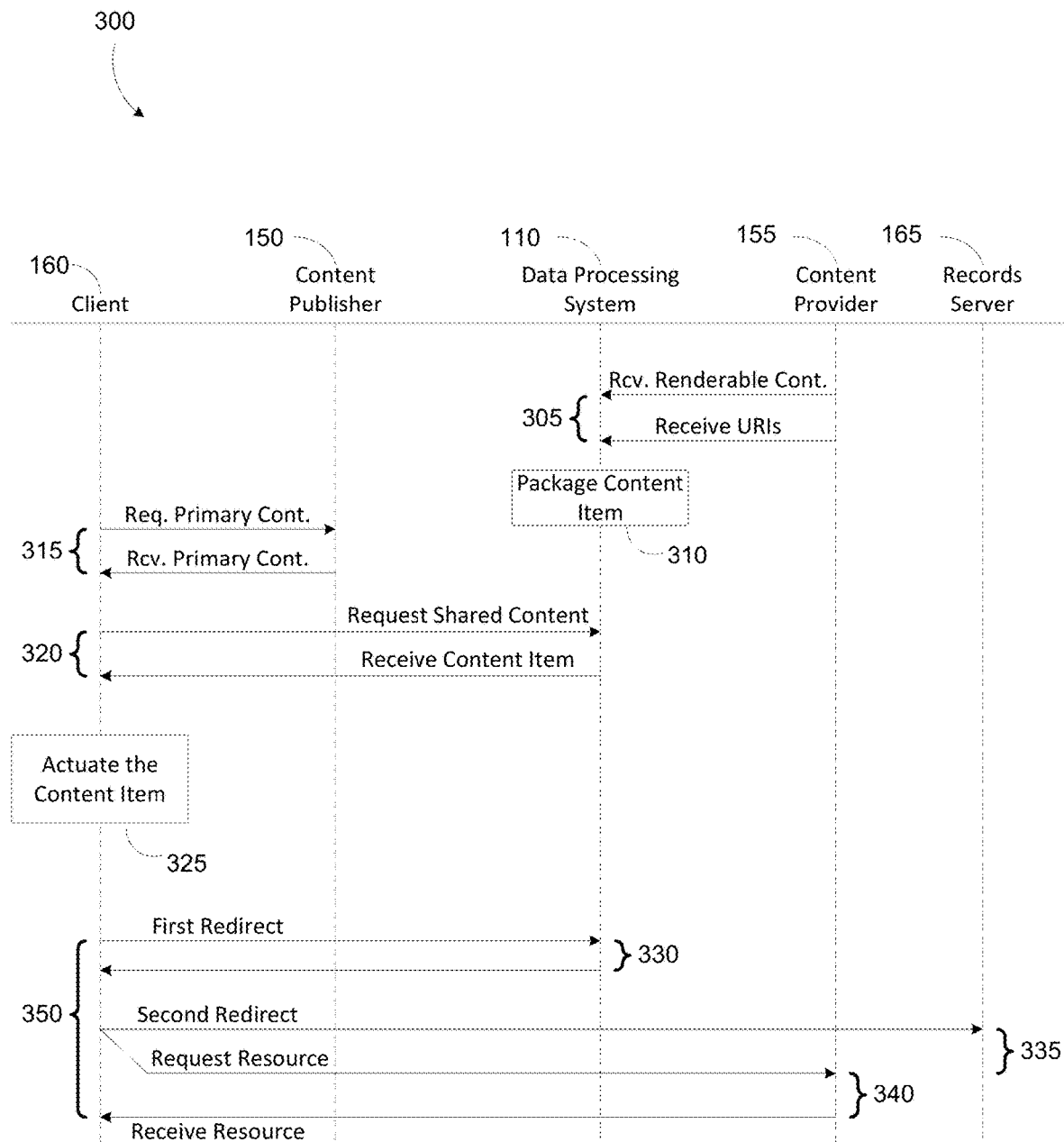
FIG. 3 is a functional diagram illustrating request tracking and resource delivery, according to an illustrative implementation.

FIG. 3 is a functional diagram 300 illustrating request tracking and resource delivery, according to an illustrative implementation. The diagram 300 illustrates the technical actions of packaging and transmitting data between the client computing device 160, the content publisher computing device 150, the data processing system 110, the content provider computing device 155, and the records server 165.

At least one solution to excessive latency between the actuation of the content item and receipt of the online resource can be achieved by providing content items with separate uniform resource identifiers (URIs) for issuing the resource request and tracking the resource request, respectively. The first URI can include a first uniform resource locator (URL) that causes a client computing device 160 to connect to a records server 165 and transmit data about the request. The client computing device 160 can connect to the records server 165 using, for example, a send beacon. The second URI can include a second URL that causes the client computing device 160 to load the online resource associated with the content item from the content provider computing device 155. The separate URIs can be executed in parallel and during an overlapping time period. In this manner, latency between the actuation of the content item and receipt of the online resource can be reduced, for example, without sacrificing the collection of content item actuation data by the records server 165 or the data processing system 110.

The data processing system 110 can therefore define a URL structure whereby a content item can include two URLs. The first URL can cause the client computing device 160 open a connection between the client computing device 160 and the records sever 165. The second URL can cause the client computing device 160 to retrieve the online resource from the content provider computing device 155 in parallel with the opening of the connection to the records server 165. In this manner, the data processing system 110 can track content item actuations by the client computing device 160, while reducing latency in the delivery of the online resource.

In act 305, the data processing system 110 can receive, from the content provider computing device 155, renderable content and two or more universal resource identifiers (URIs) for packaging into a content item. The renderable content can include text, a static image, an animated image, or video. The URIs can include a first URI and a second URI. The first URI can identify a network location of the records server 165. The records server 165 may correspond to a service used by the content provider computing device 155 for accounting a measurement of content item actuation data. The resource URI generation component 125 of the data processing system 110 can use the first URI received from the content provider computing device 155 to generate a first URL. The first URL, when actuated by the client computing device 160, can cause the client computing device 160 to open a connection, via the network 105, to the records server 165. The first URL can cause the client computing device 160 to provide data regarding the content item activation to the records server 165.

The second URI can identify a network location of the content provider computing device 155 for the retrieval of an online resource provided by the content provider computing device 155. In some implementations, the online resource may be provided by the content provider computing device 155, or by another computing device or system associated with the content provider computing device 155. For simplicity's sake, the content provider computing device 155 is described as providing both the content item and the online resource. The resource URI generation component 125 can use the second URI received from the content provider computing device 155 to generate a second URL. The second URL, when actuated by the client computing device 160, can cause the client computing device 160 to retrieve, via the network 105, the online resource from the content provider computing device 155. The resource URI generation component 125 can include additional data into the second URL. For example, the resource URI generation component 125 can include instructions that cause the client computing device 160 to perform one or more redirects prior to retrieving the online resource. These redirects can transmit data regarding the actuation of the content item to the data processing system 110 or the records server 165. In act 310, the content item packaging component 130 of the data processing system 110 can package the renderable content, a content item identifier, the first URL, and the second URL into a content item for presentation to the client computing device 160.

In act 315, the client computing device 160 can request primary content from the content publisher computing device 150. The content publishing computing device 150 can transmit the requested primary content to the client computing device 160. The client computing device 160 can render the primary content and present it for display. The primary content may be an online resource such as an online document or webpage. The primary content may include one or more placeholders or slots for shared content to be displayed. Shared content may be provided by a third-party provider, such as the data processing system 110 or the content provider computing device 155. When the client computing device 160 renders the primary content, it may request shared content from the data processing system 110.

In act 320, the client computing device 160 can submit, via the network 105, a request for shared content to the data processing system 110. The data processing system 110 can transmit the content item to the client computing device 160 in response to the request. The client computing device 160 can render the content item in the slot provided in the rendered primary content, and display both.

In act 325, the client computing device 160 can actuate the content item. The actuation may be in response to a click or other selection of the rendered content item. When the content computing device 160 actuates the content item, it can extract the first URL and the second URL that the content item packaging component 130 packaged into the content item.

In act 330, the client computing device 160 can extract the second URL and perform a redirect as specified by the second URL. The redirect can cause the client computing device 160 to open a connection, via the network 105, to the data processing system 110. The client computing device 160 can transmit data to the data processing system 110 via the connection. The data can include an identifier of the content item and an identifier of the client computing device 160. The data processing system 110 can use the received data for accounting or measurement purposes. The data processing system 110 may perform the accounting or measurement according to its role as a content item distribution network. The data processing system 110 may reply to the redirect with a unique key. The unique key can correspond to this particular content item actuation. The client computing device 160 can provide the unique key with any other redirects or resource requests corresponding to this particular content item actuation. Following completion of the redirect, the client computing device 160 can initiate a request for the online resource specified by the second URL, and commence extraction of the first URL.

In act 335, the client computing device 160 can perform two operations during overlapping time periods. First, the client computing device 160 can continue actuation of the second URL to request the online resource from the content provider computing device 155. Second, the client computing device 160 can actuate the first URL to perform a redirect to the records server 165. In some implementations, actuation of the first URL can cause the client computing device 160 to invoke a send beacon to open a connection to the records server 165 for the transmission of data regarding the content item actuation. The client computing device 160 can receive the online resource from the content provider computing device 155 during act 340.

During these operations, the client computing device 160 can provide the unique key to the content provider computing device 155 and the records server 165. The unique key can be used for later reconciliation of activities associated with this content item actuation. For example, records of the content item actuation stored at the records server 165 can be correlated to records of conversions performed by the client computing device 160 in the online resource provided by the content provider computing device 155. Because the data processing system 110 provided the unique key, reconciliation can be performed at any one of the data processing system 110, the content provider computing device 155, or the records server 165 if that entity has access to data from one or more of the other entities.

In this manner, data transmission to the records server 165 and retrieval of the online resource can occur during an overlapping time period. This can reduce latency 350 between the actuation of the content item and receipt of the online resource. Reduced latency can improve the user experience, improve retention, and reduce cancelations of online resource delivery.

Figure 4:
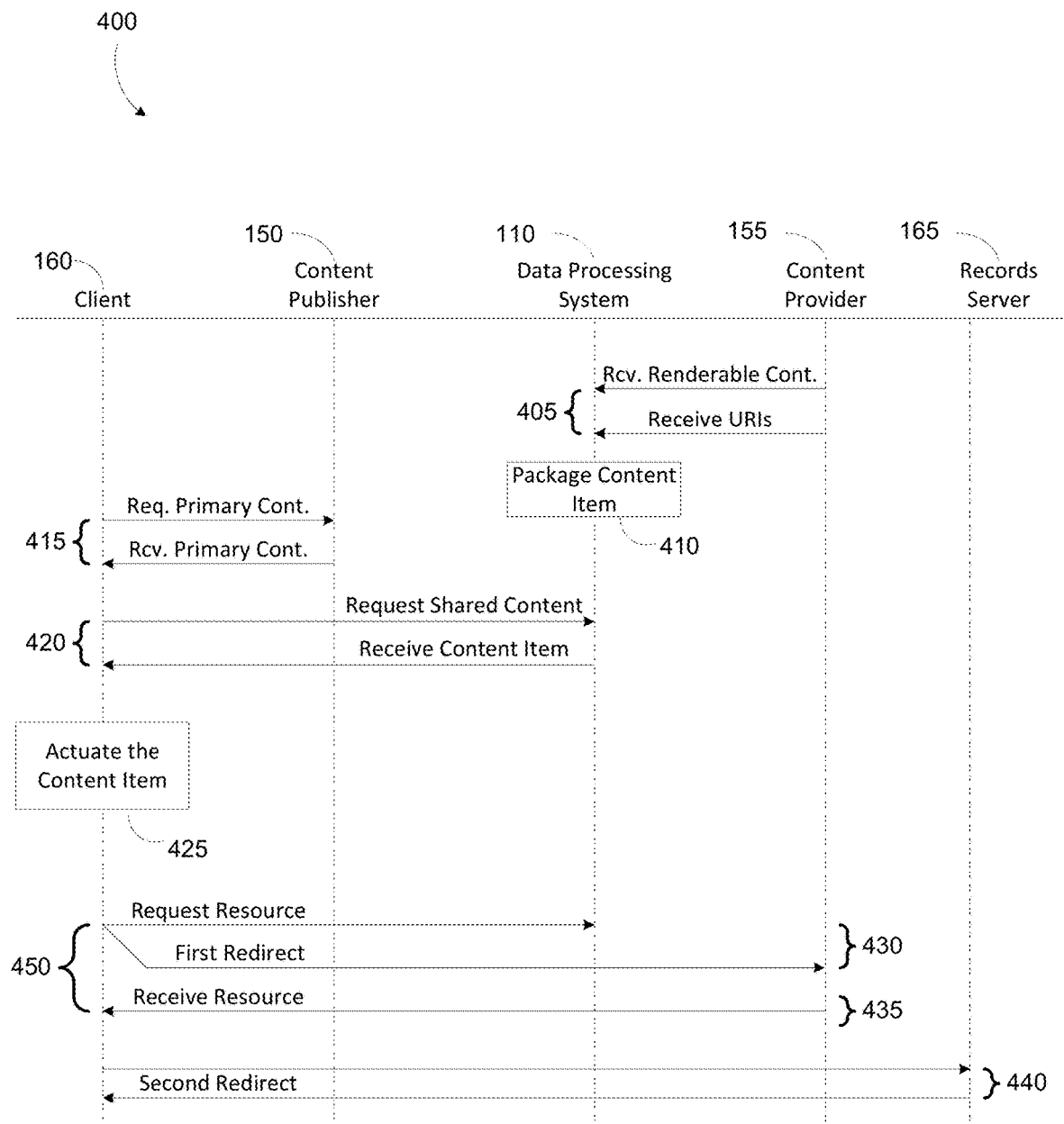
FIG. 4 is a functional diagram illustrating request tracking and resource delivery, according to an illustrative implementation.

FIG. 4 is a functional diagram 400 illustrating request tracking and resource delivery, according to an illustrative implementation. The diagram 400 illustrates the technical actions of packaging and transmitting data between the client computing device 160, the content publisher computing device 150, the data processing system 110, the content provider computing device 155, and the records server 165. Acts 405 to 420 are similar to acts 305 to 320, respectively, in the functional diagram 300. The operations in the functional diagram 400 may differ in the timing of the redirects and request. In the example shown in the functional diagram 400, the unique key for the content item actuation can be generated by the client computing device 160. The client computing device 160 can request the online resource during an overlapping time period with the first redirect and the second redirect. This may reduce the latency 450 to a duration lower than the latency 350 because the first redirect need not be completed prior to the client computing device 160 initiating the request for the online resource.

In act 405, the data processing system 110 can receive, from the content provider computing device 155, renderable content and two or more universal resource identifiers (URIs) for packaging into a content item. The renderable content can include text, a static image, an animated image, or video. The URIs can include a first URI and a second URI. The first URI can identify a network location of the records server 165. The records server 165 may correspond to a service used by the content provider computing device 155 for accounting a measurement of content item actuation data. The resource URI generation component 125 of the data processing system 110 can use the first URI received from the content provider computing device 155 to generate a first URL. The URI generation component 125 can generate the first URL to include and instructions that causes the client computing device 160 to, upon actuation of the content item and extraction of the first URL, perform a redirect to the data processing system 110. Thus the first URL, when actuated by the client computing device 160, can cause the client computing device 160 to perform a redirects to both the data processing system 110 and records server 165. In this manner, the first URL can cause the client computing device 160 to provide data regarding the content item actuation to both the data processing system 110 and the records server 165.

The second URI can identify a network location of the content provider computing device 155 for the retrieval of an online resource provided by the content provider computing device 155. In some implementations, the online resource may be provided by the content provider computing device 155, or by another computing device or system associated with the content provider computing device 155. For simplicity's sake, the content provider computing device 155 is described as providing both the content item and the associated online resource. The resource URI generation component 125 can use the second URI received from the content provider computing device 155 to generate a second URL. The second URL, when actuated by the client computing device 160, can cause the client computing device 160 to retrieve, via the network 105, the online resource from the content provider computing device 155. The client computing device 160 can receive the online resource from the computing provider computing device 155 during act 435.

In act 410, the content item packaging component 130 of the data processing system 110 can package the renderable content, a content item identifier, the first URL, and the second URL into a content item for presentation to the client computing device 160.

In act 415, the client computing device 160 can request primary content from the content publisher computing device 150. The content publishing computing device 150 can transmit the request primary content to the client computing device 160. The client computing device 160 can render the primary content and present it for display. The primary content may be an online resource such as an online document or webpage. The primary content may include one or more placeholders or slots for shared content to be displayed. The shared content may be provided by a third-party provider, such as the data processing system 110 or the content provider computing device 155. When the client computing device 160 renders the primary content, it may request shared content from the data processing system 110 for the shared content.

In act 420, the client computing device 160 can submit, via the network 105, a request for shared content to the data processing system 110. The data processing system 110 can transmit the content item to the client computing device 160 in response to the request. The client computing device 160 can render the content item in the slot provided in the rendered primary content, and display both.

In act 425, the client computing device 160 can actuate the content item. The actuation may be in response to a click or other selection of the rendered content item. When the content computing device 160 actuates the content item, it can extract the first URL and the second URL that the content item packaging component 130 packaged into the content item. During actuation of the content item, the client computing device 160 can generate a unique key for the content item actuation. In some implementations, the client computing device 160 can generate the unique key during rendering of the content item, or during the period between rendering and actuation of the content item.

In act 430, the client computing device 160 can extract the first URL and the second URL during an overlapping time period. The client computing device 160 can extract the first URL to perform redirects to the data processing system 110 and the records server 165. The redirects can cause the client computing device 160 to open connections, via the network 105, to the data processing system 110 and the records server 165, respectively. The client computing device 160 can transmit data to the data processing system 110 and the records server 165 via the connection. The data can include a content item identifier of the content item and a device identifier of the client computing device 160. The content item identifier can include the unique key. The data processing system 110 and the records server 165 can use the received data for accounting or measurement purposes. The data processing system 110 may perform the accounting or measurement according to its role as a content item distribution network. The records server 165 may perform the accounting or measurement according to its role as a measurement service of the content provider computing device 155. In some implementations, actuation of the first URL can cause the client computing device 160 to invoke a send beacon to open a connection to the records server 165 for the transmission of data regarding the content item actuation.

The client computing device 160 can extract the second URL to retrieve the online resource from the content provider computing device 155. Because the client computing device 160 generated the unique key during actuation of the content item, it can perform retrieval of the online resource during an overlapping time period with the first redirect and the second redirect. That is, the client computing device 160 need not await the data processing system 110 to provide the unique key prior to the client computing device 160 transmitting a request for the online resource to the content provider computing device 155.

The client computing device 160 can transmit the request for the online resource to the content provider computing device 155. The request can include the device identifier and the content item identifier. The content item identifier can include the unique key. The unique key can be used for later reconciliation of activities associated with this content item actuation. For example, records of the content item actuation stored at the records server 165 can be correlated to records of conversions performed by the client computing device 160 in the online resource provided by the content provider computing device 155. Because each of the data processing system 110, the content provider computing device 155, and the records server 165 received a copy of the unique key, each entity can perform reconciliation operations if it has access to data from one or more of the other entities.

In act 440, the client computing device 160 can continue actuating the first URL to complete the second redirect.

In this manner, retrieval of the online resource and redirects to the data processing system 110 and the records server 165, respectively, can occur during an overlapping time period. This can reduce latency 450 between the actuation of the content item and receipt of the online resource. Further, because the request of the online resource can occur during an overlapping time period with both the redirect to the data processing system 110 and the redirect to the records server 165, the latency 450 may be further reduced relative to the latency 350, improving user experience.

Figure 5:
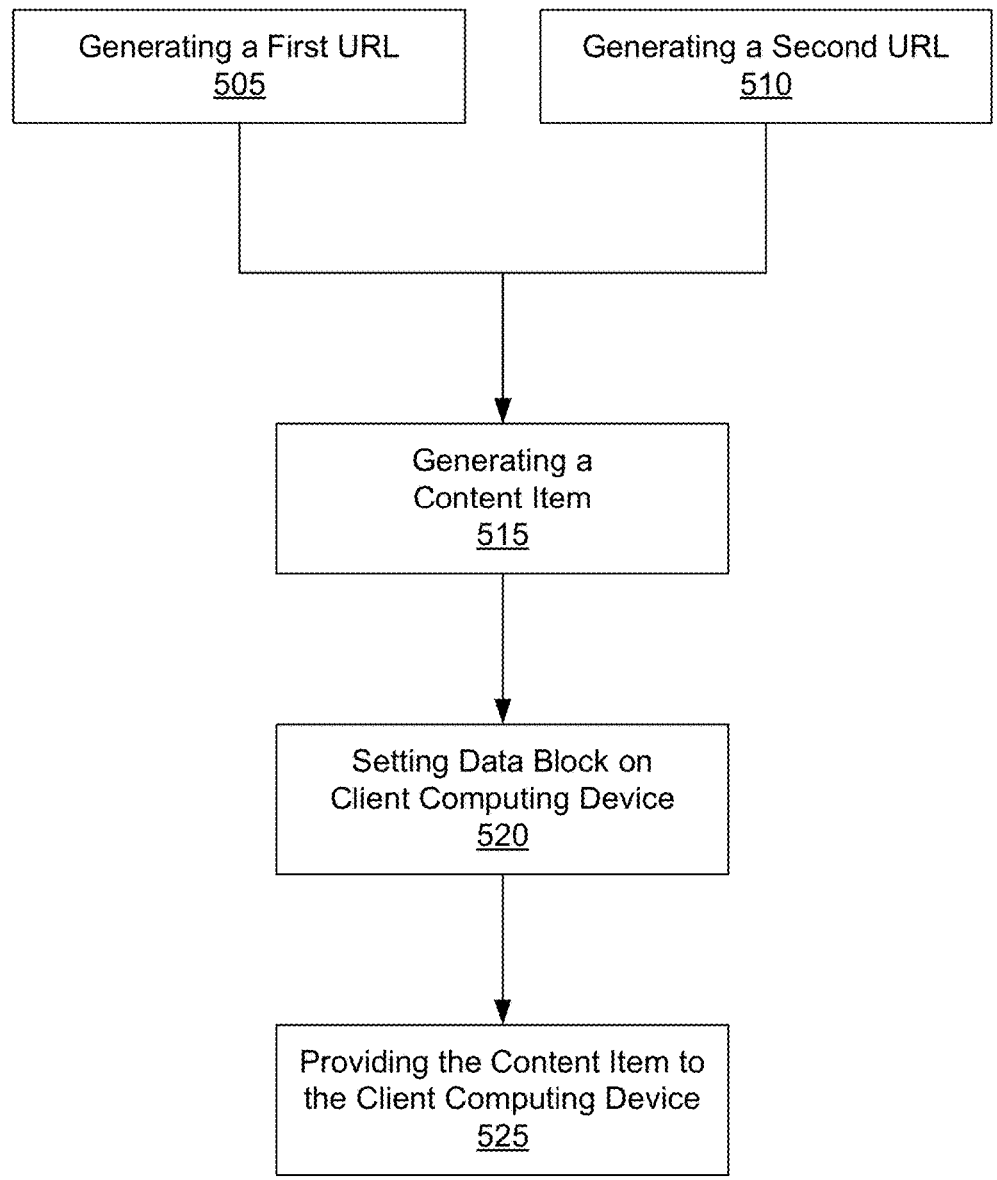
FIG. 5 is a flowchart illustrating an example method of parallel execution of request tracking and resource delivery, according to an illustrative implementation.

FIG. 5 is a flowchart illustrating an example method 500 of parallel execution of request tracking and resource delivery, according to an illustrative implementation. The method 500 can include generating a first uniform resource locator (URL) (ACT 505). The method 500 can generate a second URL (ACT 510). The method 500 can generate a content item (ACT 515). The method 500 can set a data block on the client computing device 160 (ACT 520). The method 500 can provide the content item to the client computing device 160 (ACT 525).

The method 500 can include generating first uniform resource locator (URL) (ACT 505). The method 500 can include generating, by a tracking uniform resource identifier (URI) generation component 120 of a data processing system 110, a first uniform resource locator (URL) that, responsive to actuation by a client computing device 160, causes the client computing device 160 to send a content item identifier of a content item and a device identifier of the client computing device 160, via a computer network 105, to a records server 165 at a first network location identified by the first URL. In some implementations, the method 500 can include generating the first URL by including an instruction in the first URL to invoke a send beacon to create a connection between the client computing device 160 and the records server 165 for transmission of the content item identifier and the device identifier. In some implementations, the content item identifier can comprise a unique key generated by the client computing device 160.

The method 500 can include generating second URL (ACT 510). The method 500 can include generating, by a resource URI generation component 125 of the data processing system 110, a second URL that, responsive to actuation by the client computing device 160, causes the client computing device 160 to retrieve, via the computer network 105, a first resource from a second network location identified by the second URL for display by the client computing device 160. In some implementations, the method 500 can include generating the second URL by including an instruction in the second URL that causes the client computing device 160 to perform a redirect via the data processing system 110 prior to retrieval of the first resource. In some implementations, the content item identifier can comprise a unique key generated by the data processing system 110.

The method 500 can include generating content item (ACT 515). The method 500 can include generating, by a content item packaging component 130, the content item, the content item comprising a renderable portion, the content item identifier, the first URL, and the second URL. In some implementations, the renderable portion can include one or more of an image or text.

The method 500 can include setting a data block on the client computing device 160 (ACT 520). The method 500 can include setting, by a remote device identification component 135 of the data processing system, via the computer network 105, a data block on the client computing device 160 to include the device identifier.

The method 500 can include providing the content item to the client computing device 160 (ACT 525). The method 500 can include providing, by a content item placement component 140 of the data processing system 110 to the client computing device 160 via the computing network 105, the content item for display on the client computing device 160, the client computing device 160 operational to extract the first URL and the second URL from the content item during an overlapping time period responsive to actuation of the content item. In some implementations, the client computing device 160 operational to extract the first URL during an overlapping time period with retrieval of the first resource. In some implementations, the method 500 can include receiving, by the content item placement component 140 from the client computing device 160, a request for content for display in a second resource displayed by the client computing device 160, and wherein the content item placement component 140 sends the content item in response to the request. In some implementations, the content item placement component 140 receives the request from a browser application executed on the client computing device 160. In some implementations, the request can comprise a request for a content item to fill a slot in the second resource rendered by the browser application. In some implementations, the first resource includes a landing page or other online document associated with the content item.

Figure 6:
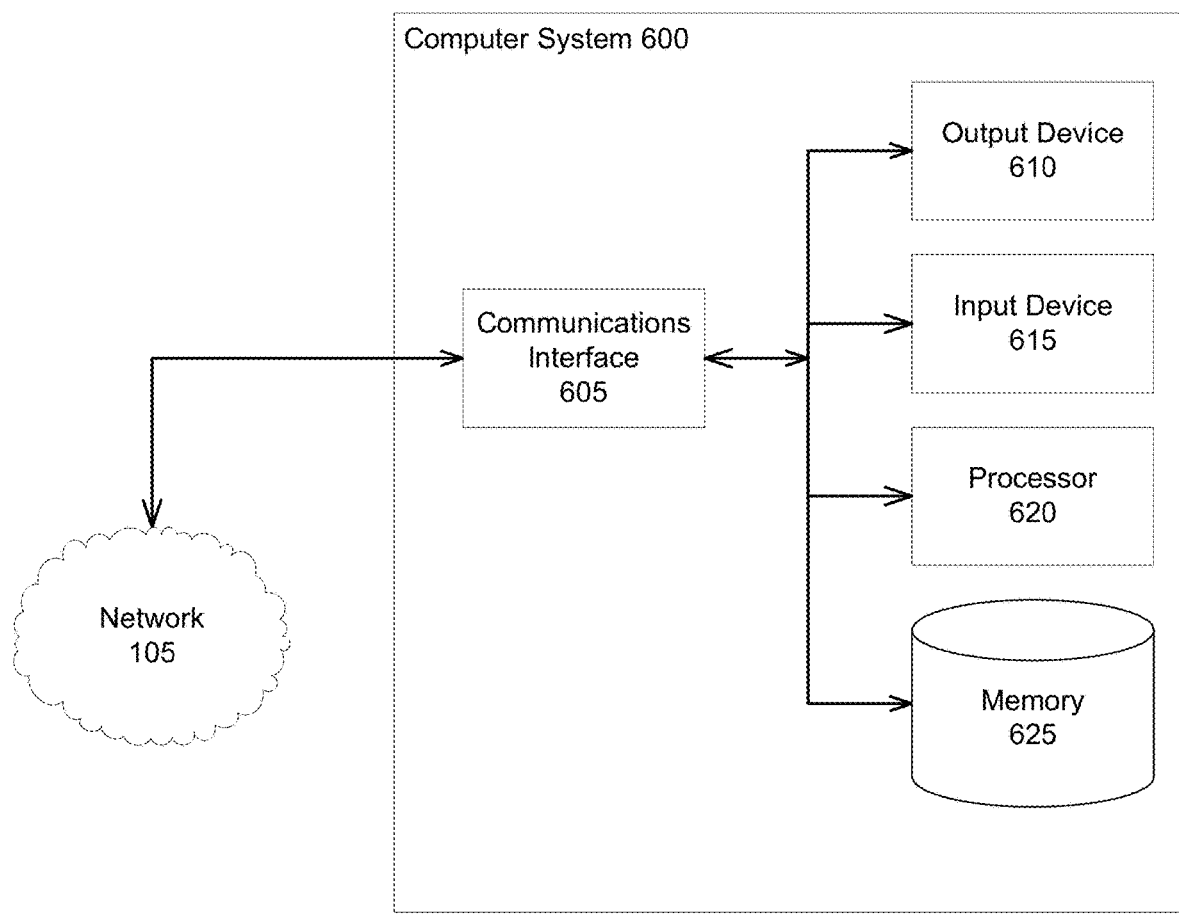
FIG. 6 is a block diagram illustrating a general architecture for a computer system that may be employed to implement elements of the systems and methods described and illustrated herein, according to an illustrative implementation.

FIG. 6 shows the general architecture of an illustrative computer system 600 that may be employed to implement any of the computer systems discussed herein (including the data processing system 110 and components thereof including the tracking URI generation component 120, resource URI generation component 125, the content item packaging component 130, the remote device identification component 135, the content item placement component 140, and the database 145) in accordance with some implementations. The computer system 600 can be used to provide information via the network 105; for example, to provide a content item for display on the client computing device 160 via the network 105. The computer system 600 includes one or more processors 620 communicatively coupled to at least one memory 625, one or more communications interfaces 605, one or more output devices 610 (e.g., one or more display units) or one or more input devices 615 (e.g., one or more touchscreens, keypads, microphones, or the like). The processors 620 can be included in the data processing system 110.

The memory 625 can include computer-readable storage media, and can store computer instructions such as processor-executable instructions for implementing the operations described herein. The data processing system 110 or the components of each can include the memory 625 to store the data received from the content provider computing device 155 or the client computing device 160, for example. The at least one processor 620 can execute instructions stored in the memory 625 and can read from or write to the memory information processed and or generated pursuant to execution of the instructions.

The processors 620 can be communicatively coupled to or control the at least one communications interface 605 to transmit or receive information pursuant to execution of instructions. For example, the communications interface 605 can be coupled to a wired or wireless network, bus, or other communication means and can allow the computer system 600 to transmit information to or receive information from other devices (e.g., other computer systems). One or more communications interfaces 605 can facilitate information flow between the components of the environment 100. In some implementations, the communications interface 605 can (e.g., via hardware components or software components) provide a website as an access portal to at least some aspects of the computer system 600. Examples of communications interfaces 605 include user interfaces.

The output devices 610 can allow information to be viewed or perceived in connection with execution of the instructions. The input devices 615 can allow a user to make manual adjustments, make selections, enter data or other information, or interact in any of a variety of manners with the processor during execution of the instructions.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing system or apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The term "data processing system" or "computing device" "module" "engine" or "component" encompasses apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The data processing system 110 or components thereof can include or share one or more data processing apparatus, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The environment 100 or system 600 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server (e.g., received by the data processing system 110 from the content publisher computing device 150, the content provider computing device 155, or the client computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the database 115, the content item selection module 120, the prediction module 125, the content item auction module 130, or the conversion detection module 135 can be a single module, a logic device having one or more processing circuits, or part of one or more servers of the data processing system 110.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system comprising:
one or more processors configured to:
provide, to a client computing device communicatively coupled to the one or more processors via a communication network, a content item for display on the client computing device, the content item comprising:
a renderable portion,
a content item identifier,
a first URL, the first URL causes the client computing device, responsive to actuation of the content item by the client computing device, to send a content item identifier of the content item and a device identifier of the client computing device, to a records server at a first network location identified by the first URL via the communication network, and a second URL, the second URL causes the client computing device, responsive to actuation of the content item by the client computing device, to retrieve via the communication network a first resource from a second network location identified by the second URL for display by the client computing device, the content item, when actuated by the client computing device, is configured to cause the client computing device to:

send the content item identifier of the content item and the device identifier of the client computing device, via the communication network, to a records server at the first network location identified by the first URL; and retrieve the first resource from the second network location identified by the second URL independent of receiving a response from the records server.

2. The system of claim 1, wherein the first URL includes an instruction to invoke a send beacon to create a connection between the client computing device and the records server for transmission of the content item identifier and the device identifier.

3. The system of claim 1, wherein the first resource includes at least one of a landing page and an online document corresponding to the content item.

4. The system of claim 1, wherein the renderable portion includes one or more of an image or text.

5. The system of claim 1, wherein the content item identifier comprises a unique key generated by the client computing device.

6. The system of claim 1, wherein the system receives, from the client computing device, a request for content for display in a second resource displayed by the client computing device, and wherein the one or more processors send the content item in response to the request.

7. The system of claim 6, wherein the system receives the request from a browser application executed on the client computing device, the request comprising a request for content to fill a slot in the second resource rendered by the browser application.

8. The system of claim 1, wherein the second URL comprises an instruction that causes the client computing device to perform a redirect via the one or more processors prior to retrieval of the first resource.

9. The system of claim 8, wherein the content item identifier comprises a unique key generated by the one or more processors.

10. The system of claim 8, wherein the client computing device actuates the first URL during a first time period overlapping with a second time period when the first resource is retrieved.

11. A method comprising:

providing, by a data processing system including one or more processors to a client computing device, a content item for display on the client computing device, the content item comprising:

a renderable portion, a content item identifier, a first URL, the first URL causes the client computing device to send a content item identifier of the content item and a device identifier of the client computing device, via the communication network, to a records server at a first network location identified by the first URL, responsive to actuation of the content item by the client computing device, and a second URL, the second URL causes the client computing device to retrieve, via the communication network, a first resource from a second network location identified by the second URL for display by the client computing device, responsive to actuation of the content item by the client computing device, the content item, when actuated by the client computing device, is configured to cause the client computing device to:

send the content item identifier of the content item and the device identifier of the client computing device, via the communication network, to the records server at the first network location identified by the first URL; and retrieve the first resource from the second network location identified by the second URL independent of receiving a response from the records server.

12. The method of claim 11, wherein the first URL includes an instruction to invoke a send beacon to create a connection between the client computing device and the records server for transmission of the content item identifier and the device identifier.

13. The method of claim 11, wherein the first resource includes at least one of a landing page and an online document corresponding to the content item.

14. The method of claim 11, wherein the renderable portion includes one or more of an image or text.

15. The method of claim 11, wherein the content item identifier comprises a unique key generated by the client computing device.

16. The method of claim 11, comprising:

receiving, by the data processing system from the client computing device, a request for content for display in a second resource displayed by the client computing device, the data processing system sending the content item in response to the request.

17. The method of claim 16, comprising:

receiving, by the data processing system, the request from a browser application executed on the client computing device, the request comprising a request for content to fill a slot in the second resource rendered by the browser application.

18. The method of claim 11, wherein the second URL includes an instruction in the second URL that causes the client computing device to perform a redirect via the data processing system prior to retrieval of the first resource.

19. The method of claim 18, wherein the content item identifier comprises a unique key generated by the data processing system.

20. The method of claim 18, wherein the client computing device actuates the first URL during a first time period overlapping with a second time period during which retrieval of the first resource is performed.

* * * * *